(12) United States Patent
Okimoto

(10) Patent No.: US 8,403,392 B2
(45) Date of Patent: Mar. 26, 2013

(54) GLOVE BOX FOR VEHICLE

(75) Inventor: Kohei Okimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/384,391

(22) PCT Filed: Jun. 17, 2010

(86) PCT No.: PCT/JP2010/060289
§ 371 (c)(1),
(2), (4) Date: Jan. 17, 2012

(87) PCT Pub. No.: WO2011/010519
PCT Pub. Date: Jan. 27, 2011

(65) Prior Publication Data
US 2012/0112489 A1  May 10, 2012

(30) Foreign Application Priority Data

Jul. 21, 2009 (JP) ................................. 2009-170117

(51) Int. Cl.
*B60N 3/12* (2006.01)
(52) U.S. Cl. ...................................... 296/37.12; 292/121
(58) Field of Classification Search ............... 296/37.12, 296/37.8; 292/24, 44, 56, 95, 121, 96, 219, 292/194
See application file for complete search history.

(56) References Cited

U.S. PATENT DOCUMENTS
7,484,792 B2 * 2/2009 Penner ..................... 296/187.05

FOREIGN PATENT DOCUMENTS

| JP | 59-154573 U | 10/1984 |
| JP | 64-2921 Y2 | 1/1989 |
| JP | 3-46143 Y2 | 9/1991 |
| JP | 4-26614 Y2 | 6/1992 |
| JP | 7-29245 U | 6/1995 |
| JP | 9-020179 A | 1/1997 |
| JP | 2001-098817 A | 4/2001 |
| JP | 2002-322854 A | 11/2002 |
| JP | 2007-176261 A | 7/2007 |

* cited by examiner

*Primary Examiner* — Joseph Pape
(74) *Attorney, Agent, or Firm* — Carrier Blackman & Associates, P.C.; Joseph P. Carrier; William D. Blackman

(57) ABSTRACT

A glove box for a vehicle includes a lid, which opens and closes an opening portion of a storage box provided in an instrument panel in a closed position of the lid, and a locking claw which is provided at the lid engages with a locking hole provided in the storage box. Accordingly, even if a passenger secondarily collides with the instrument panel and the storage box is deformed at the time of collision of a vehicle, the storage box deforms with the lid, since the rib of the lid is inserted in the locking hole of the storage box, whereby the positional relation of the locking claw of the lid and the locking hole of the storage box is inhibited from changing, and the locking claw can be prevented from being disengaged from the locking hole and opening the lid. The structure is a simple one in which only a pair of ribs are added to the storage box of the existing glove box, and therefore, the structure can be realized at low cost.

8 Claims, 7 Drawing Sheets

(WHEN BEING LOCKED)

(WHEN BEING UNLOCKED)

(WHEN WEIGHT IS APPLIED TO INSTRUMENTAL PANEL)

GLOVE BOX FOR VEHICLE

TECHNICAL FIELD

The present invention relates to a glove box for a vehicle in which an opening portion of a storage box provided in an instrument panel is covered with an openable and closable lid, and the lid is held in a closed position by engaging a locking claw provided at the lid with a locking hole provided in the storage box.

BACKGROUND ART

There is known a lid locking device for a glove box which locks a lid in a closed position by engaging a hook provided at the lid of the glove box with a striker, wherein a receiving hole is formed in a cover portion of the striker, and a tip end of the hook which is engaged with the striker is further engaged with the receiving hole of the cover portion of the striker, whereby the hook is prevented from being disengaged from the striker to release the lid when an impact is applied to an instrument panel, from the following Patent Document 1.

Further, there is known a lid locking device for a glove box which engages a striker engaging member provided at a lid of the glove box with a striker to lock the lid to a closed position, wherein an insertion port which is formed in a rear surface of the lid and in which the striker is fitted is reinforced with a pair of side restraining walls which are disposed at lateral opposite sides of the striker, and an upper restraining wall which connects upper ends of the side restraining walls, whereby a relative position of the striker to the lid is prevented from changing, and the striker engaging member is prevented from disengaging from the striker to release the lid when an impact is applied to an instrument panel, from the following Patent Document 2.

PRIOR ART DOCUMENT

Patent Document

Patent Document 1: Japanese Utility Model Laid-Open No. 07-29245
Patent Document 1: Japanese Patent Laid-Open No. 2001-98817

DISCLOSURE OF INVENTION

Problems to be Solved by the Invention

Incidentally, the inventions described in the Patent Document 1 and Patent Document 2 need significant design changes in the cover portion of the striker and the insertion port of the striker, and therefore, have not only the problem that the need becomes the cause of increase in cost, but also the problem that it is difficult to apply the inventions to the glove boxes for vehicles, which do not have a metallic striker, and have locking claws engaged in locking holes formed at box sides to lock the lids.

The present invention is made in view of the aforementioned circumstances, and has an object to prevent a lid of a glove box provided in an instrument panel from opening by an impact of secondary collision, with a simple structure.

Means for Solving the Problems

In order to attain the above object, according to a first aspect of the present invention, there is proposed a glove box for a vehicle in which an opening portion of a storage box provided in an instrument panel is covered with an openable and closable lid, and the lid is held in a closed position by engaging a locking claw provided at the lid with a locking hole provided in the storage box, characterized in that a rib which is projectingly provided at the lid is inserted in the locking hole when the lid is in the closed position.

Furthermore, according to a second aspect of the present invention, in addition to the first aspect, there is proposed the glove box for a vehicle, wherein the locking claw is connected to an operation lever provided at the lid, and the operation lever is urged in a direction in which the locking claw engages with the locking hole, with a spring.

Here, a torsion spring 23 in an embodiment corresponds to the spring of the present invention.

Effects of the Invention

According to the first aspect of the present invention, when the lid, which opens and closes the opening portion of the storage box provided in the instrument panel, is in the closed position, a locking claw provided at the lid engages with the locking hole provided in the storage box. Even if the passenger secondarily collides with the instrument panel and the storage box is deformed at the time of collision of a vehicle, the rib interferes with the locking hole, and the lid deforms with the storage box, since the rib of the lid is inserted in the locking hole of the storage box, whereby the positional relation of the locking claw of the lid and the locking hole of the storage box is inhibited from changing, and the locking claw can be prevented from being disengaged from the locking hole and opening the lid. The structure is a simple one in which only a pair of ribs are added to the storage box of the existing glove box, and therefore, the structure can be realized at low cost.

Further, according to the second aspect of the present invention, the locking claw is connected to the operation lever which is provided at the lid, and the operation lever is urged in the direction in which the locking claw is engaged with the locking hole, with a spring. Therefore, by operating the operation lever against the elastic force of the spring, the locking claw is removed from the locking hole, and the lid can be opened.

EXPLANATION OF REFERENCE NUMERALS AND SYMBOLS

Figure 1:
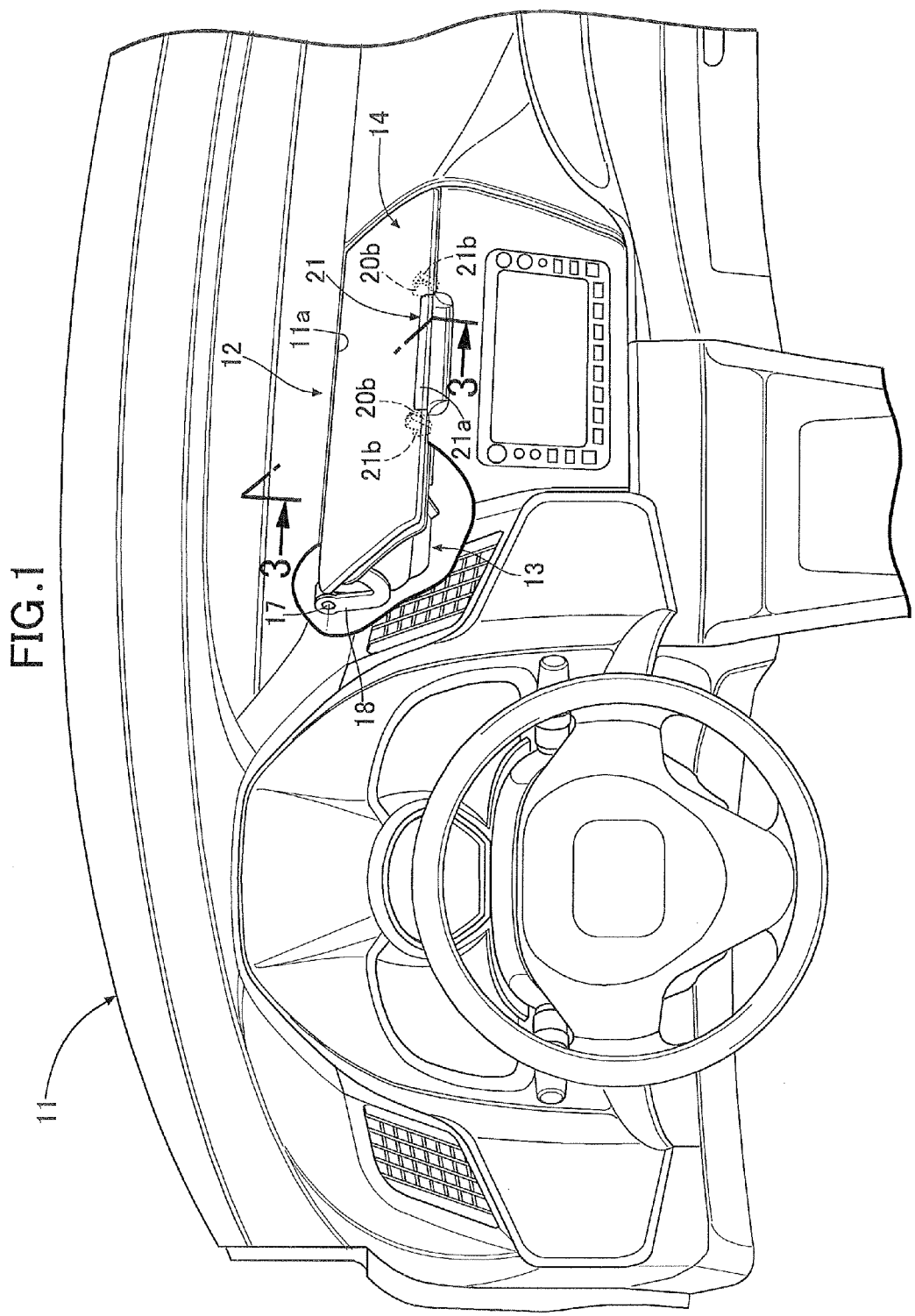
FIG. 1 is a front view of an instrument panel of an automobile including a glove box according to the present invention. (first embodiment)

11 Instrument panel
13 Storage box
13f Locking hole
14 Lid
20b Rib
21 Operation lever
21b Locking claw
23 Torsion spring (spring)

MODE FOR CARRYING OUT THE INVENTION

A mode for carrying out the present invention is explained below based on FIGS. 1 to 7.

First Embodiment

As shown in FIG. 1, a compact glove box 12 which accommodates small articles is provided in a central portion in a vehicle width direction of an instrument panel 11 of an automobile. The glove box 12 is unitized by integrally including a storage box 13 which is disposed inside the instrument panel 11, and a lid 14 which forms a part of a top surface of the instrument panel 11 and opens and closes an opening of a top surface of the storage box 13.

As shown in FIGS. 2 to 5, the storage box 13 in the shape of a vessel with the top surface opened includes a plurality of mounting brackets 13a and with bolts 15 which penetrate through these mounting brackets 13a, the storage box 13 is fixed to the instrument panel 11. In this state, the lid 14 is fitted in an opening 11a which is formed in the instrument panel 11. A tray 16 which forms a mounting surface for articles is fixed to a bottom surface of the storage box 13.

First ends of hinge arms 18 and 18 are pivotally supported at boss portions 13c and 13c which are connectively provided at front ends of left and right side walls 13b and 13b of the storage box 13 via hinge shafts 17 and 17, and the other ends of the hinge arms 18 and 18 penetrate through through-holes 13e and 13e which are formed in a flange 13d at the opening of the top surface of the storage box 13 and are connected to a lower surface of a front end of the lid 14. The hinge arms 18 and 18 are urged in a direction to open the lid 14 by torsion springs (not illustrated) which are provided around the hinge shafts 17 and 17. A pair of left and right locking holes 13f and 13f are formed in a rear edge of the flange 13d.

The lid 14 is formed by connecting an upper member 19 and a lower member 20, and an operation portion 21a of an operation lever 21 is exposed to cutaway portions 19a and 20a (see FIG. 3) which are formed at rear edges thereof. The operation lever 21 integrally includes a pair of locking claws 21b and 21b at an outer side in the vehicle width direction of the operation portion 21a. Four brackets 19b and 19b; 19c and 19c are projectingly provided downward on the lower surface of the upper member 19, and the pair of locking claws 21b and 21b are pivotally supported swingably by the brackets 19b and 19b at the outer side in the vehicle width direction via supporting shaft pins 22 and 22. Further, projections 21d and 21d which are located on the axes of the supporting shaft pins 22 and 22 are provided at brackets 21c and 21c which are projectingly provided upward on the top surface of the operation portion 21a, and these projections 21d and 21d are swingably engaged with the brackets 19c and 19c at an inner side in the vehicle width direction of the upper member 19 (see FIG. 4).

The operation lever 21 is urged downward around the supporting shaft pins 22 and 22 by a torsion spring 23 which is provided between the upper member 19 of the lid 14 and the operation lever 21. By the elastic force of the torsion spring 23, the locking claws 21b and 21b are urged in a clockwise direction of FIG. 5 to be engaged with the locking holes 13f and 13f of the storage box 13, and the lid 14 is held in a closed position.

Figure 5:
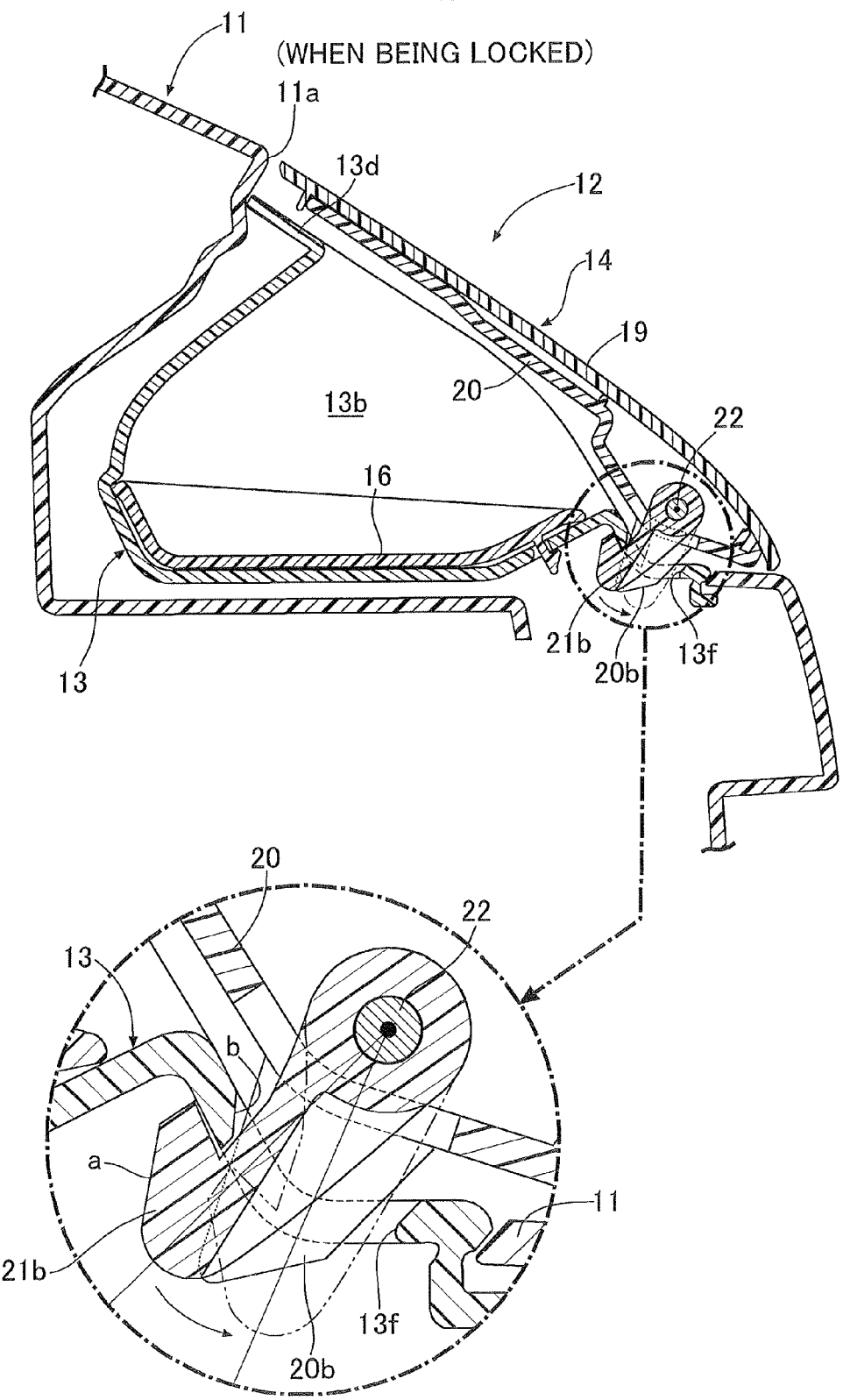
FIG. 5 is a sectional view taken along a line 5-5 in FIG. 4. (first embodiment)

When the lid 14 is closed, by only pushing the lid 14 down to the closed position, inclines surfaces a and a of the locking claws 21b and 21b are guided to edges b and b of the locking holes 13f and 13f to swing in a counterclockwise direction of FIG. 5, whereby the locking claws 21b and 21b are automatically engaged with the locking holes 13f and 13f.

Figure 3:
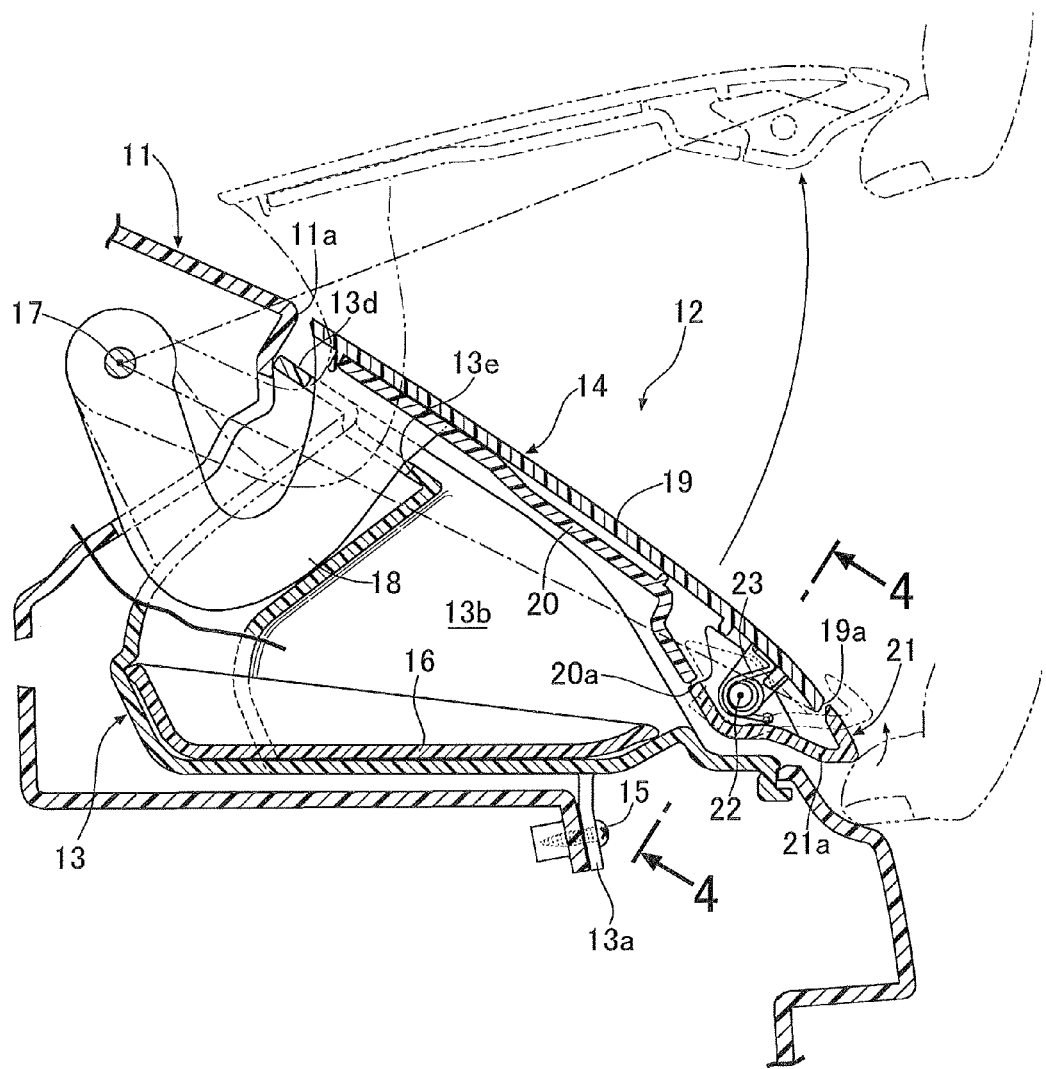
FIG. 3 is an enlarged sectional view taken along a line 3-3 in FIG. 1. (first embodiment)
Figure 6:
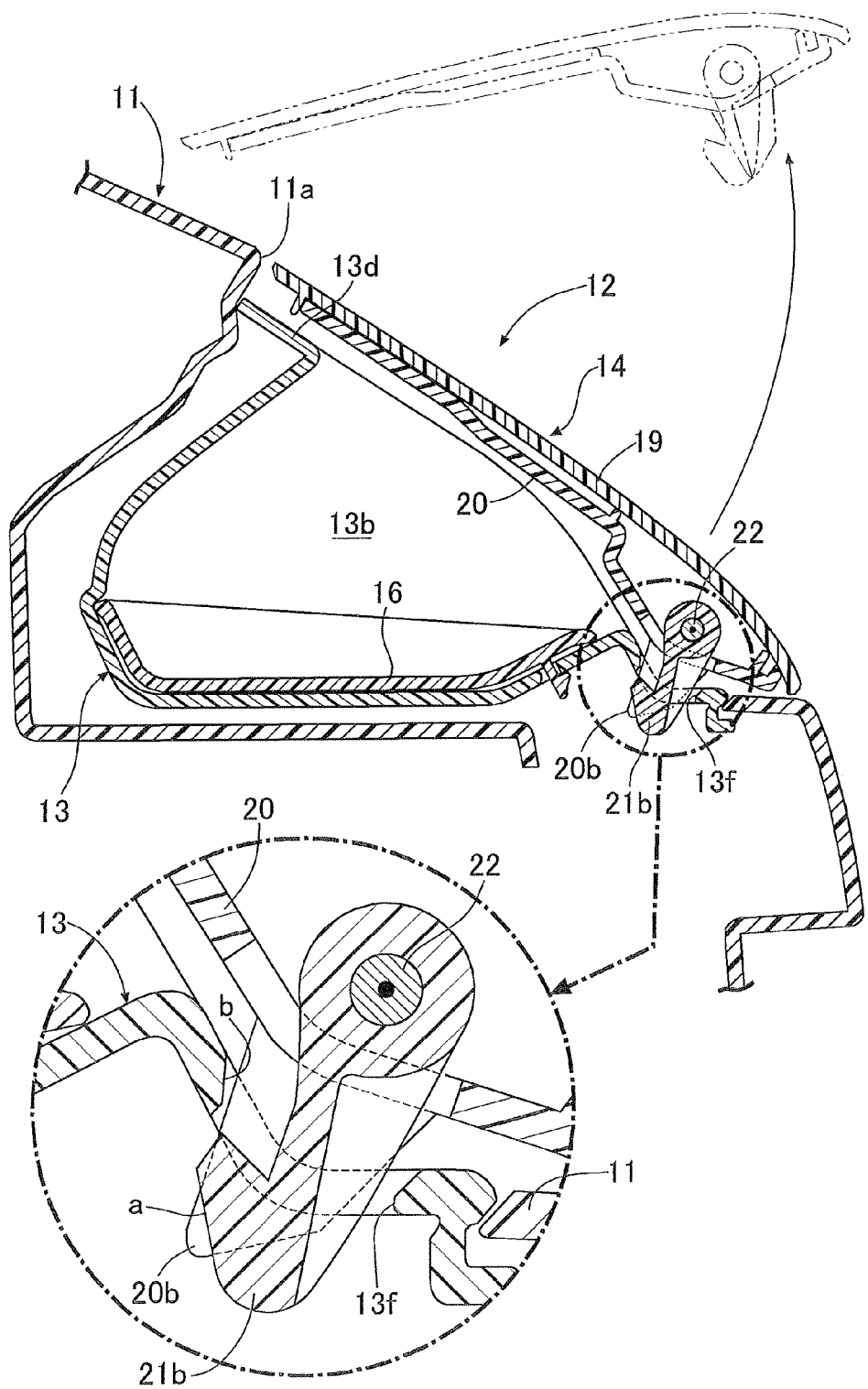
FIG. 6 is an operation explanatory view at the time of lock disengagement of a lid. (first embodiment)

Further, as shown in FIG. 3, when a finger is put on the operation portion 21a of the operation lever 21 of the lid 14, and is lifted up against the elastic force of the torsion spring 23, the locking claws 21b and 21b swing in the counterclockwise direction to be disengaged from the locking holes 13f and 13f in FIG. 6, and the lid 14 can be opened toward an opened position.

Figure 2:
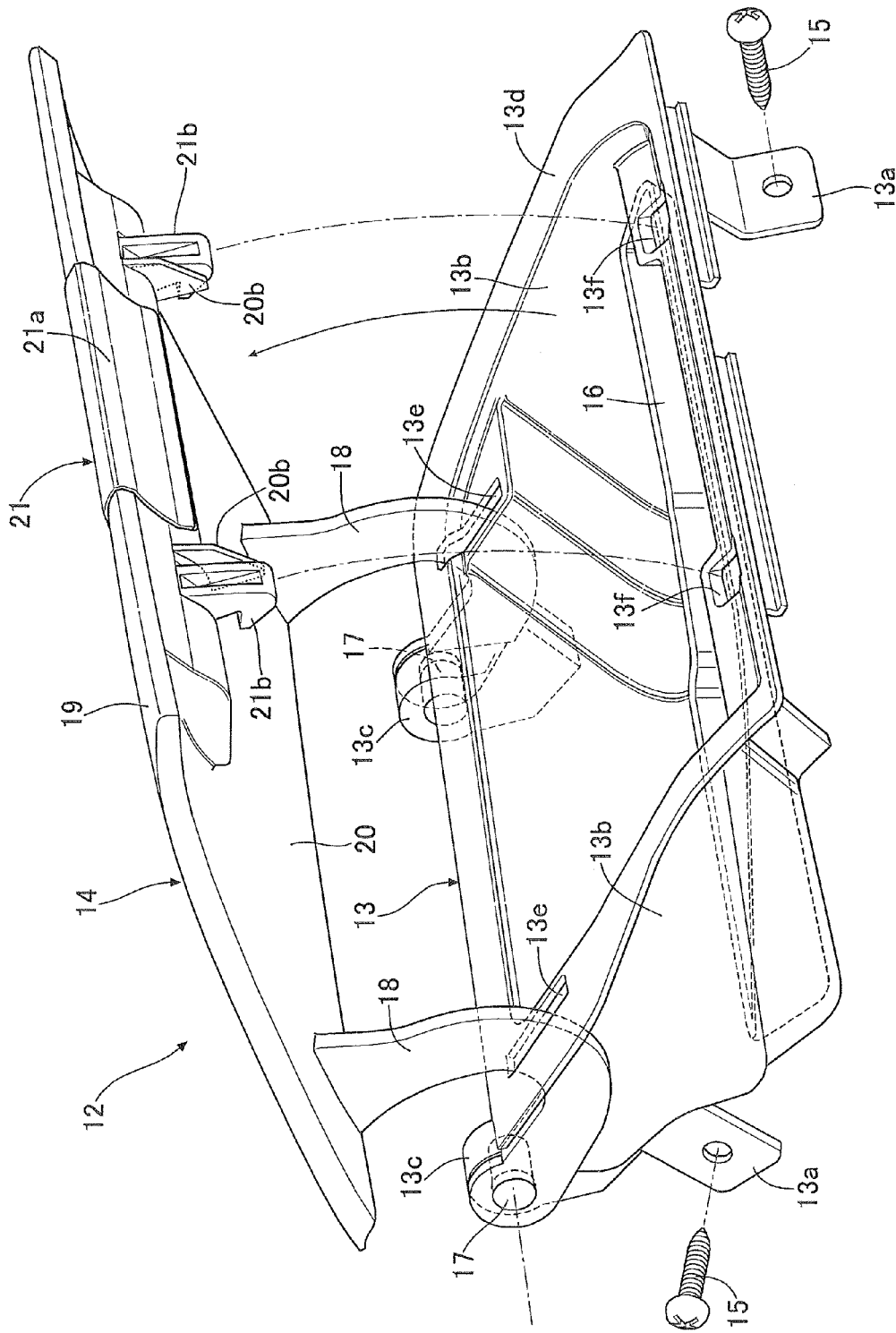
FIG. 2 is a perspective view of the glove box of FIG. 1. (first embodiment)
Figure 4:
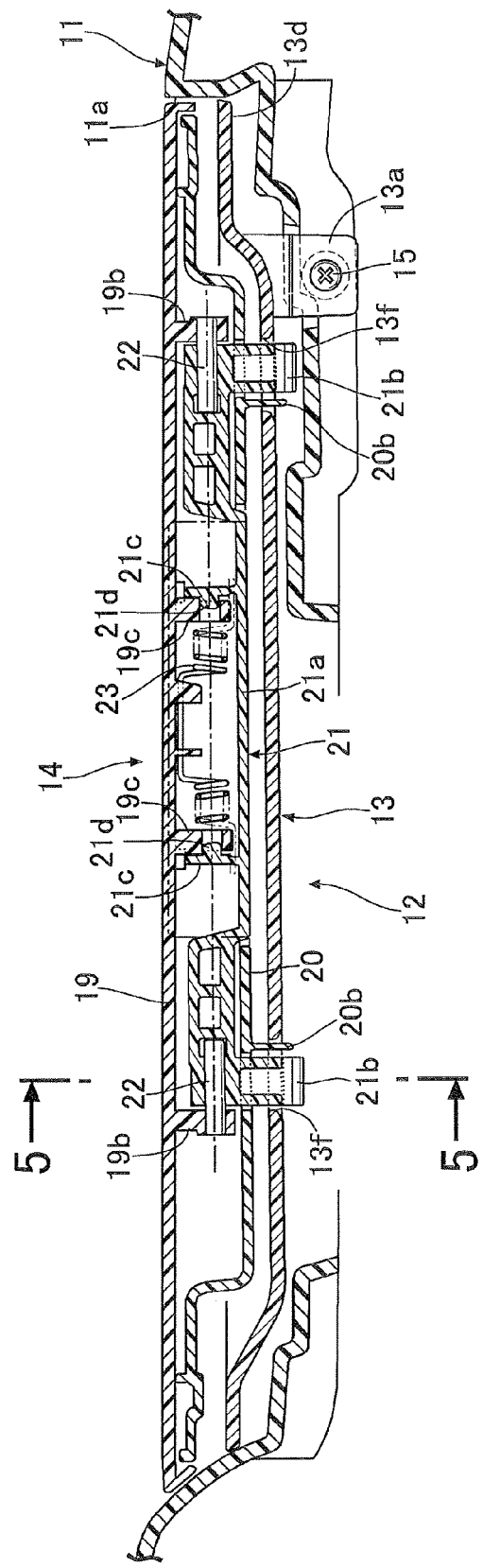
FIG. 4 is a sectional view taken along a line 4-4 in FIG. 3. (first embodiment)

As is obvious from FIGS. 2, 4 and 5, at the lower member 20 of the lid 14, a pair of plate-shaped ribs 20b and 20b are projectingly provided adjacently to the inner sides in the vehicle width direction of the pair of locking claws 21b and 21b. When the lid 14 is in the closed position, the ribs 20b and 20b of the lower member 20 are inserted in the locking holes 13f and 13f of the storage box 13. The ribs 20b and 20b are in such a shape as not to catch or engage the locking holes 13f and 13f when the lid 14 performs normal opening and closing operations.

Figure 7:
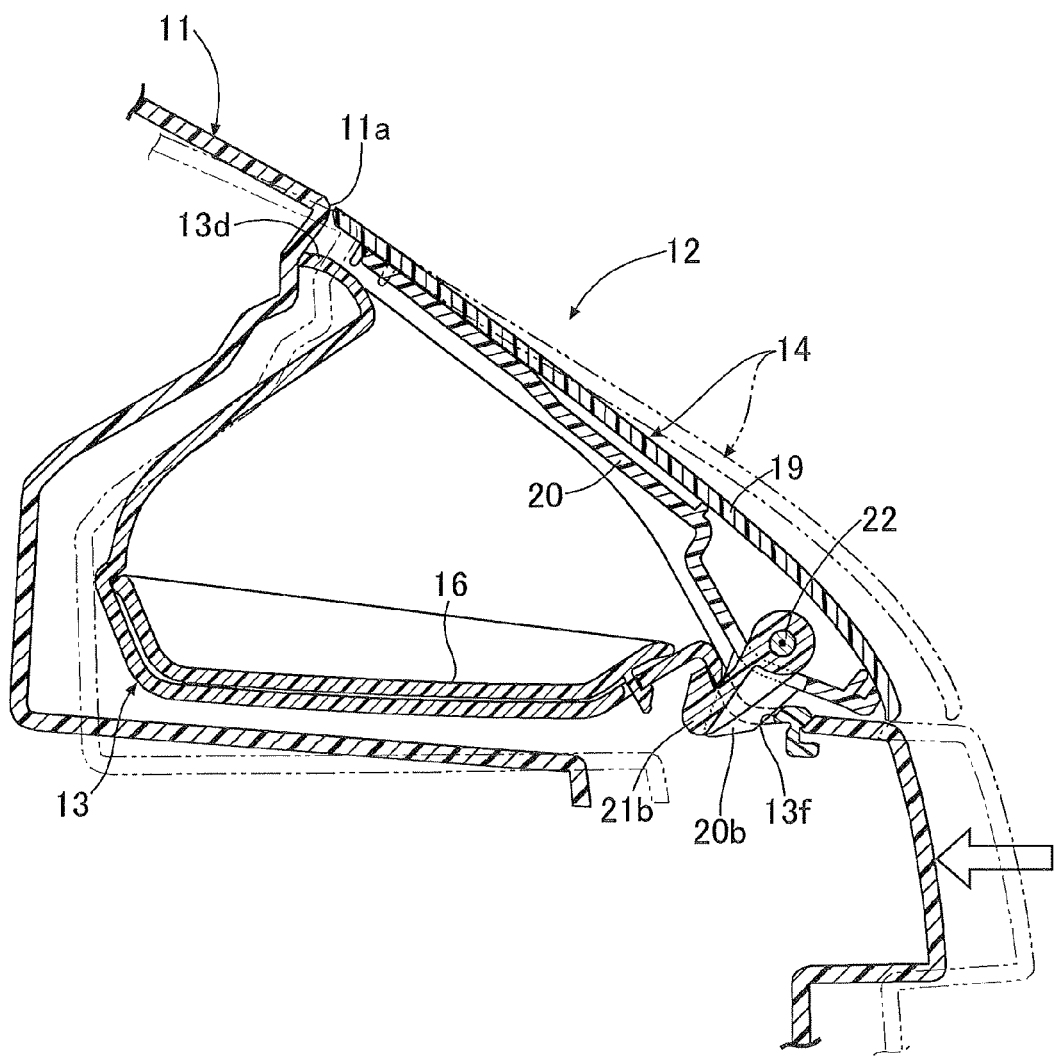
FIG. 7 is an operation explanatory view at the time of a secondary collision. (first embodiment)

As shown in FIG. 7, when an automobile has a head-on collision and deceleration occurs to a vehicle body, with the result that a passenger is moved forward by the inertia to have a secondary collision with the instrument panel 11, the storage box 13 is deformed forward with the instrument panel 11 by the impact. If only the storage box 13 is deformed forward and the lid 14 is not deformed at this time, the locking holes 13f and 13f of the storage box 13 moves forward with the locking claws 21b and 21b integrated with the lid 14 being left behind, whereby the locking claws 21b and 21b would likely become disengaged from the locking holes 13f and 13f if the ribs were not present, and in such situation the lid 14 is opened, and is likely to interfere with the passenger.

However, according to the present embodiment, when the storage box 13 is deformed forward, the locking holes 13f and 13f and the ribs 20b and 20b interfere with each other, whereby the lid 14 with the ribs 20b and 20b inserted in the locking holes 13f and 13f also follows the deformation of the storage box 13 and deforms forward, and therefore, the positional relation of the locking claws 21b and 21b which are provided at the lid 14 and the locking holes 13f and 13f which are provided in the storage box 13 is kept constant. Thereby, the locking claws 21b and 21b are prevented from disengaging from the locking holes 13f and 13f, and undesirable opening of the lid 14 can be reliably prevented.

In addition, the structure is a simple one with only a pair of ribs 20b and 20b being added to the storage box 13 of the existing glove box 12, and therefore, the structure can be realized at low cost.

An embodiment of the present invention is described above, but various design changes can be made within the range without departing from the gist of the present invention.

For example, in the embodiment, the storage box 13 is formed by a separate member from the instrument panel 11, but the storage box 13 can be made integrally with the instrument panel 11.

Further, the lid 14 of the embodiment is opened upward, but may be the one that is opened downward.

The invention claimed is:

1. A glove box for a vehicle comprising a storage box having an opening portion and configured to be provided in an instrument panel, and an openable and closable lid for covering the opening portion of the storage box, wherein the lid is held in a closed position by engaging a locking claw provided at the lid with a locking hole provided in the storage box, wherein a rib which is projectingly provided at the lid is inserted in the locking hole when the lid is in the closed position, said rib being in such a plate shape as not to engage the locking hole when the lid performs normal opening and closing operations, and wherein said plate shaped rib is disposed only on one lateral side of the locking claw.

2. The glove box for a vehicle according to claim 1, wherein the locking claw is connected to an operation lever provided at the lid, and the operation lever is urged in a direction in which the locking claw engages with the locking hole, with a spring.

3. The glove box for a vehicle according to claim 1, wherein said plate shaped rib is disposed in spaced relation adjacent to the locking claw on the one lateral side thereof.

4. The glove box for a vehicle according to claim 1, wherein said plate shaped rib is selectively movable between a locked position in which the locking claw is engaged with the locking hole and an unlocked position in which the locking claw is not engaged with the locking hole, and the plate shaped rib is disposed in a single fixed position on the lid adjacent to the locking claw.

5. The glove box for a vehicle according to claim 1, further comprising: a second locking claw provided at said lid and which engages with a second locking hole provided in the storage box for also holding the lid in the closed position, and a second rib projectingly provided at the lid which is inserted in the second locking hole when the lid is in the closed position, said second rib also having such a plate shape as not to engage said second locking hole when the lid performs normal opening and closing operations.

6. A glove box for a vehicle comprising a storage box having an opening portion and configured to be provided in an instrument panel, and an openable and closable lid for covering the opening portion of the storage box, wherein the lid is held in a closed position by engaging first and second locking claws provided at the lid respectively with first and second pair of locking holes provided in the storage box, wherein first and second ribs which are projectingly provided at the lid are inserted respectively in the first and second locking holes when the lid is in the closed position, said first and second ribs being in such a plate shape as not to engage the locking holes when the lid performs normal opening and closing operations, wherein the locking claws are spaced from each other on the lid and connected to a common operation lever provided at the lid, and the operation lever is urged in a direction in which the locking claws engage with the locking holes, with a spring.

7. A glove box for a vehicle comprising a storage box having an opening portion and configured to be provided in an instrument panel, and an openable and closable lid for covering the opening portion of the storage box, wherein the lid is held in a closed position by engaging first and second locking claws provided at the lid respectively with first and second locking holes provided in the storage box, wherein first and second ribs which are projectingly provided at the lid are inserted respectively in the first and second locking holes when the lid is in the closed position, said first and second ribs being in such a plate shape as not to engage the first and second locking holes when the lid performs normal opening and closing operations, wherein said first plate shaped rib is disposed only on one lateral side of the first locking claw, and said second plate shaped rib is disposed only on one lateral side of the second locking claw.

8. The glove box for a vehicle according to claim 5, wherein said locking claws are selectively movable between locked positions in which said locking claws are engaged with the locking holes and an unlocked position in which said locking claws are not engaged with the locking holes, and each of said plate shaped ribs is disposed in a single fixed position on the lid adjacent to the locking claw associated therewith.

* * * * *